United States Patent [19]

Tieszen et al.

[11] 4,282,347

[45] Aug. 4, 1981

[54] PREPARATION OF BRANCHED POLYMERS OF ARYLENE SULFIDE

[75] Inventors: Dale O. Tieszen; Lacey E. Scoggins, both of Bartlesville, Okla.

[73] Assignee: Phillips Petroleum Company, Bartlesville, Okla.

[21] Appl. No.: 66,584

[22] Filed: Aug. 14, 1979

[51] Int. Cl.$^3$ .............................................. C08G 75/16
[52] U.S. Cl. .................................... 528/388; 528/321; 528/363; 528/364; 528/373; 525/537
[58] Field of Search ............... 528/388, 321, 363, 364, 528/373; 525/537

[56] References Cited

U.S. PATENT DOCUMENTS

| 4,038,261 | 7/1977 | Crouch et al. | 528/388 |
| 4,038,262 | 7/1977 | Edmonds | 528/388 |
| 4,064,114 | 12/1977 | Edmonds | 528/388 |
| 4,116,947 | 9/1978 | Edmonds et al. | 528/388 |

*Primary Examiner*—Harold D. Anderson

[57] ABSTRACT

A process for the production of branched polymers of arylene sulfide in which a reaction mixture of (1) at least one p-dihalobenzene, (2) at least one alkali metal sulfide, (3) at least one organic amide, (4) water in an amount of about 1.0 mole to about 2.4 moles per mole of alkali metal sulfide, and (5) at least one alkali metal carboxylate is contacted under polymerization conditions for a time sufficient to form arylene sulfide polymer and the arylene sulfide polymer formed in said reaction mixture is contacted under polymerization conditions with a polyhaloaromatic compound having more than two halogen substituents per molecule for a time having a range of up to about 75 minutes before entering upon termination of the polymerization process. An embodiment of the process in which the alkali metal sulfide is produced in situ by the reaction of an excess of alkali metal hydroxide with alkali metal hydrosulfide. An embodiment in which carbon dioxide is contacted with arylene sulfide polymer formed in the reaction mixture to stabilize the polymer. A melt spun fiber that is the product of this reaction.

10 Claims, No Drawings

PREPARATION OF BRANCHED POLYMERS OF ARYLENE SULFIDE

BACKGROUND OF THE INVENTION

This invention relates to the production of branched arylene sulfide polymers. In accordance with one aspect of this invention it relates to a process for the production of branched arylene sulfide polymers in which a polyhaloaromatic compound having more than two halogen substituents per molecule is added to the polymerization mixture late in the polymerization process of p-dihalobenzene. In accordance with another aspect of the invention it relates to the production of branched arylene sulfide polymers suitable for melt spinning which have good thermal aging resistance. In still another aspect of the invention relates to the polymers produced by the process of this invention and to melt spun fibers of good thermal aging resistance produced therefrom.

As taught in U.S. Pat. No. 3,919,177, it is known that in the production of a p-phenylene sulfide polymer by employing a p-dihalobenzene, an alkali metal sulfide, and an organic amide, the use, additionally, of an alkali metal carboxylate results in a p-phenylene sulfide polymer of higher molecular weight, as evidenced by a higher inherent viscosity and a lower melt flow, than that obtained in the absence of an alkali metal carboxylate.

In U.S. Pat. No. 4,116,947, it is disclosed that branched poly(arylene sulfide) resins are prepared using, in addition to a p-dihalobenzene, a polyhaloaromatic compound having more than two halogen substituents per molecule which can be added to the reaction mixture after polymerization of p-dihalobenzene has begun. Polymers of low melt flow suitable for spinning into fibers are thus prepared.

The present invention provides branched arylene sulfide polymers which possess sufficiently low melt flow for molding, extruding or spinning into fibers and which, because of the addition of polyhaloaromatic compound within a specified period late in the polymerization process for p-dihalobenzene, exhibit superior thermal stability to those branched arylene sulfide polymers prepared by initial addition of the polyhaloaromatic compound. The process of the present invention also provides better control of melt flow than do prior art processes for making fiber-quality linear arylene sulfide polymers.

Accordingly, it is an object of this invention to provide an improved process for the production of branched arylene sulfide polymers.

A further object of the invention is to provide branched arylene sulfide polymers suitable for melt spinning into fiber of good thermal aging resistance.

Other objects, aspects, and the several advantages of this invention will be apparent to those skilled in the art upon a study of the specification and the appended claims.

In accordance with this invention, branched arylene sulfide polymers are produced by contacting under polymerization conditions for a time sufficient to form arylene sulfide polymer a reaction mixture of (1) at least one p-dihalobenzene; (2) at least alkali metal sulfide; (3) at least one organic amide; (4) water in an amount of about 1.0 mole to about 2.4 moles per mole of alkali metal sulfide, said amount including water of hydration; and (5) at least one alkali metal carboxylate; and contacting under polymerization conditions a polyhaloaromatic compound having more than two halogen constituents per molecule with the arylene sulfide polymer formed in the reaction mixture with the contacting of polyhaloaromatic compound in an amount sufficient to produce branched polymer and for a time having a time range of up to about 75 minutes before entering upon termination of the polymerization process. The resulting polymers, without prior curing, can be molded, extruded, or spun into fibers.

In another embodiment of the invention carbon dioxide is added to the arylene sulfide polymer formed in the reaction mixture to stabilize the resultant polymer relative to thermal degradation during product recovery.

In still another embodiment of the invention termination of the polymerization process is entered upon by the commencement of distillation of volatiles from the polymerization mixture.

p-Dihalobenzenes which can be employed in the process of this invention can be represented by the formula

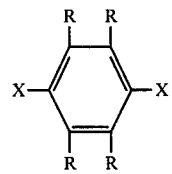

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhaloaromatic compounds useful in the practice of this invention are those having more than two halogen substituents per molecule which can be utilized in preparing branched polymers. They can be represented by the formula R'$X_n$, where each X is selected from the group consisting of chlorine, bromine, and iodine, n is an integer of 3 to 6, and R' is a polyvalent aromatic radical of valence n which can have up to about 4 methyl substituents, the total number of carbon atoms in R' being within the range of 6 to about 16.

Examples of some polyhaloaromatic compounds having more than two halogen substituents per molecule which can be employed in the process of this invention include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Alkali metal sulfides which can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. If desired, the alkali metal sulfide can be produced by reaction of hydrogen sulfide or alkali metal bisulfide with alkali metal hydroxide in an aqueous medium. However, when the amount of free water and/or water of hydration present exceeds that specified hereinabove, excess water must be removed, e.g., by distillation, prior to the polymerization step. The invention encompasses the in situ production of alkali metal sulfide in the reaction mixture with the reaction of an excess of alkali metal hydroxide with alkali metal bisulfide being a preferred operation.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof. N-Methyl-2-pyrrolidone is preferred.

Alkali metal hydroxides which can be employed in the process of this invention include lithium hydroxide, sodium hydroxide, potassium hydroxide, rubidium hydroxide, cesium hydroxide, and mixtures thereof.

Alkali metal carboxylates which can be employed in the process of this invention can be represented by the formula $R^4CO_2M$, where $R^4$ is a hydrocarbyl radical selected from alkyl, cycloalkyl, and aryl, and combinations thereof such as alkaryl, aralkyl, and the like, and the number of carbon atoms in $R^4$ is within the range of 1 to about 20 and M is an alkali metal. If desired, the alkali metal carboxylate can be employed as a hydrate or as a solution or dispersion in water. However, if the total amount of free water and/or water of hydration present, including that associated with the alkali metal sulfide, exceeds the amount specified hereinabove, excess water must be removed, e.g., by distillation, prior to the polymerization step.

Examples of some alkali metal carboxylates which can be employed in the process of this invention include sodium acetate, sodium propionate, potassium 2-methylpropionate, cesium butyrate, sodium valerate, rubidium hexanoate, sodium heptanoate, sodium 2-methyloctanoate, sodium dodecanoate, potassium 4-ethyltetradecanoate, sodium octadecanoate, sodium heneicosanoate, cesium cyclohexanecarboxylate, sodium cyclododecanecarboxylate, sodium 3-methylcyclopentanecarboxylate, sodium cyclohexylacetate, sodium benzoate, sodium m-toluate, sodium phenylacetate, sodium 4-phenylcyclohexanecarboxylate, sodium p-tolylacetate, sodium 4-ethylcyclohexylacetate, and the like, and mixtures thereof.

Although the mole ratio of p-dihalobenzene to alkali metal sulfide can vary somewhat, generally it will be within the range of about 0.9:1 to about 2:1, preferably within the range of about 0.95:1 to about 1.2:1. The amount of polyhaloaromatic compound having more than two halogen substituents per molecule can vary considerably, depending in part on the halogen content of said polyhaloaromatic compound and on the water and alkali metal carboxylate content of the polymerization system, but generally it will be used in an amount up to about 0.6 part by weight per 100 parts by weight p-dihalobenzene, preferably about 0.05 to about 0.4 part by weight per 100 parts by weight p-dihalobenzene.

The mole ratio of alkali metal carboxylate to alkali metal sulfide can vary over a wide range, but generally will be within the range of about 0.05:1 to about 4:1, preferably within the range of about 0.1:1 to about 2:1. The mole ratio of alkali metal hydroxide in excess of that required to react with alkali metal bisulfide to yield alkali metal sulfide can vary over a wide range, but generally will be within the range of about 0.008:1 to about 1:1, preferably about 0.015:1 to about 0.6:1.

The mole ratio of organic amide to alkali metal sulfide can vary considerably, but generally will be within the range of about 2:1 to about 10:1, preferably within the range of about 3:1 to about 6:1.

In the process of this invention it is desirable that a dehydration step, i.e., distillation of water, be conducted on a mixture comprising an alkali metal bisulfide and organic amide, preferably together with an alkali metal hydroxide. Although the alkali metal carboxylate can be added before or after the dehydration step, it is preferable to add it before the dehydration. When the alkali metal carboxylate in hydrated form is employed, it is preferable that this salt forming a composition with organic amide be dehydrated in one step to form a first dehydrated composition, followed by addition of the alkali metal hydroxide and the alkali metal bisulfide in hydrated form or as an aqueous mixture to form a second composition and then a second dehydration step be carried out to form a second dehydrated composition. When carried out in two steps, the dehydration is conducted with less foaming than is encountered when the dehydration is conducted in a single step. In the process of this invention the p-dihalobenzene is most practically added after the dehydration step(s).

Although the reaction temperature at which the polymerization is conducted can vary over a wide range, generally it will be within the range of about 180° C. to about 285° C., preferably within the range of about 190° C. to about 275° C. The reaction time can vary greatly, depending in part on the reaction temperature, but generally will be within the range of about 1 hour to about 60 hours, preferably within the range of about 2 hours to about 10 hours. In a presently preferred embodiment, the polymerization is conducted within a first temperature range of about 180° C. to about 245° C., preferably from about 190° C. to about 245° C., and then within a second temperature range of about 245° C. to about 285° C. preferably about 245° C. to about 275° C., the total reaction time for the polymerization in these two temperature ranges being within the range of about 1 hour to about 60 hours, preferably about 2 hours to about 10 hours, about 15 percent to about 70 percent of which time is within the first temperature range, the temperature during at least 50 percent of the reaction time in the first temperature range being at least 20° C. below the final temperature in the second temperature range. Here, too, the reaction times are dependent, in part, on the reaction temperatures. In either or both of the temperature ranges, the temperature can be increased continuously or maintained predominantly at selected levels within relatively restricted temperature limits.

The pressure at which the polymerization reaction is conducted should be sufficient to maintain the p-dihalobenzene, the polyhaloaromatic compound having more than two halogen substituents per molecule, the organic amide, and the water substantially in the liquid phase.

If desired, e.g., in order to stabilize the resultant polymer relative to thermal degradation during product recovery, carbon dioxide can be applied to the polymerization mixture at or near completion of the polymerization step in a manner similar to that described in U.S. Pat. No. 4,038,262, preferably within a time ranging up to about an hour before entering on termination of the polymerization process.

The amount of carbon dioxide can vary over a wide range, but will generally be in the range of 1:10 to 20:1 moles per mole of alkali metal hydroxide in excess of that required to react with alkali metal bisulfide, a preferred range is 1:1 to 10:1 moles per mole of excess alkali metal hydroxide.

A currently preferred embodiment of the invention employs carbon dioxide added near the end of the above described higher temperature stage of the two temperature stage polymerization process and the polyhalo aromatic compound added not only within the time range of 30 minutes before to 30 minutes after the carbon dioxide addition, but also before the distillation of volatiles from the polymerization mixture.

It is also within the scope of this invention to employ a process in which the above-described treatment with carbon dioxide is not utilized. Whether or not carbon dioxide treatment is employed, the polyhaloaromatic compound must be added to the polymerization mixture at a time sufficiently before polymerization is terminated to allow the formation of branched polymer. Generally this is in a time range up to about 75 minutes before entering upon termination of the polymerization process—which, in the presently preferred, integrated process, is signalled by commencement of distillation of volatiles—to the moment of commencement of distillation of volatiles from the polymerization mixture, preferably up to one hour before volatile distillation is begun. It must be recognized that in this process the commencement of distillation of volatiles does not immediately terminate the polymerization thereby necessitating the terminology "entering upon termination of the polymerization process" as the point in time from which the period for addition of polyhaloaromatic compound is measured.

In a presently preferred recovery step, after the polymerization step, addition of polyhaloaromatic and the optional addition of carbon dioxide have been completed, the N-methyl-2-pyrrolidone, as well as any water which is present, is distilled, and the residual product is washed with water and dried to yield the desired arylene sulfide polymer. In an especially preferred procedure, distillation of the N-methyl-2-pyrrolidone and any water therein is conducted in a manner similar to that used in U.S. Pat. No. 3,839,302. For example, the polymerization reaction mixture at an initial temperature within the range of about 220° C. to about 330° C. can be concentrated by reducing the pressure sufficiently, e.g., to a pressure within the range of about 0 psig to about 30 psig, to distill some of the N-methyl-2-pyrrolidone and any water present. Steam can then be passed into the residual mixture if desired, e.g., to a pressure of 140–160 psig, to inhibit discoloration during further processing. The mixture can then be reheated to a temperature within the range of about 220° C. to about 330° C. under autogenous pressure. The pressure on the mixture can then be reduced to approximately atmospheric pressure to distill the water and most of the remaining N-methyl-2-pyrrolidone. Remaining N-methyl-2-pyrrolidone can be evaporated readily by heating the residual product, e.g., at a temperature within the range of about 205° C. to about 250° C., after which the residual product can be washed with water to remove inorganic salt and dried, thereby providing the arylene sulfide polymer in substantially pure form. N-Methyl-2-pyrrolidone recovered from the polymerization reaction mixture can be recycled to the polymerization reactor.

The arylene sulfide polymers produced by the process of this invention can be blended with fillers, pigments, extenders, other polymers, and the like. They can be cured through crosslinking and/or chain extension, e.g., by heating at temperatures up to about 480° C. in the presence of a free oxygen-containing gas, to provide cured products having high thermal stability and good chemical resistance. They are useful in the production of coatings, films, molded objects, and fibers. Those arylene sulfide polymers having a relatively low melt flow, e.g., within the range of about 1 to about 700 (determined by the method of ASTM D 1238-70, modified to a temperature of 316° C. using a 5-kg weight, the value being expressed as g/10 min.), are particularly useful in the production of fibers, molded objects, and films since the usual curing step is obviated.

The branched arylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer.

EXAMPLE I

In prior art runs, poly(p-phenylene sulfide) was prepared employing addition of 1,2,4-trichlorobenzene at the beginning of the polymerization.

For Run 1, a 360 l reactor was charged with 5.18 kg sodium acetate, 135.1 l N-methyl-2-pyrrolidone, 33.2 kg of a 50.42 weight percent solution of sodium hydroxide in water and 34.6 kg of a 65.7 weight percent solution of sodium hydrosulfide in water (also containing 0.91 weight percent sodium sulfide). Water (33.8 kg) was distilled from the reactor under a pressure of 217 kPa and a reactor temperature range of 170° to 239° C. Water (1.9 kg) and a mixture of molten p-dichlorobenzene (69.5 kg) and 1,2,4-trichlorobenzene (63 gm) were added to the reactor. The stirred reactor was heated at 233° C. and 710 kPa for 2 hours after which the temperature and pressure were increased to 266° C. and 1350 kPa, respectively, for one hour. Carbon dioxide (1.59 kg) was added and heating continued at 266° C. for an additional 40 minutes. The reaction mixture was concentrated by first venting to atmospheric pressure for 25 minutes then heating to 283° C. for 12 minutes. The concentrated polymer solution was dumped slowly into a ribbon blender at 240° C. to flash the volatiles. The resultant polymer was washed thrice with water, then dried in a steam tube drier. Poly(p-phenylene sulfide) (37.2 kg) having a melt flow of 268 was recovered.

In Run 2, a similar prior art run was conducted employing 99.2 gm 1,2,4-trichlorobenzene. Results are reported in Table I.

EXAMPLE II

The following inventive runs were conducted to prepare poly(p-phenylene sulfide) in which 1,2,4-trichlorobenzene was added at the time of carbon dioxide addition at or near the end of polymerization.

In Run 3 a 360 l reactor was charged with 8.9 kg sodium acetate, 138.9 l N-methyl-2-pyrrolidone, 33.5 kg of a 50.71 weight percent solution of sodium hydroxide in water and 36.2 kg of a 64.22 weight percent solution of sodium hydrosulfide in water (also containing 1.0 weight percent sodium sulfide). Water (29.5 kg) was distilled from the reactor under a pressure of 217 kPa and a reactor temperature range of 172° to 233° C. Water (1.9 kg) and molten p-dichlorobenzene (70.37 kg) were added to the reactor after which the stirred reaction mixture was heated at 232° C. and 690 kPa for two hours and then at 267° C. and 1360 kPa for an additional one hour. 1,2,4-Trichlorobenzene (57.7 gm) and carbon dioxide (reactor pressurized to 1560 kPa) were added to the reactor and heating was continued at 266° C. for an additional one hour. The reaction mixture was concentrated by first venting to atmospheric pressure for 27 minutes then heating at 283° C. for 16 minutes. The concentrated polymer solution was dumped slowly into a ribbon blender at 240° C. to flash the volatiles. The resultant polymer was washed thrice with water and dried in a steam tube drier. Poly(p-phenylene sulfide) (39 kg) having a melt flow of 259 was recovered.

Similarly were prepared in Runs 4 and 5 other batches of polymer employing slightly different proportions of ingredients. In Table I are recorded the variables and results.

TABLE I

| Run No. | Na$_2$S$^a$ | NaOAc$^b$ | DCB$^c$ | TCB$^d$ | Melt Flow$^f$ |
|---|---|---|---|---|---|
| 1 | 1.00 | 0.15 | 0.98 | 0.0008 | 268 |
| 2 | 1.00 | 0.15 | 0.98 | 0.0012 | 247 |
| 3 | 1.00 | 0.26 | 0.99 | 0.0008 | 259 |
| 4 | 1.00 | 0.26 | 1.00 | 0.0009 | 250 |
| 5 | 1.00 | 0.26 | 1.00 | 0.0011 | 249 |

Mole Ratio$^e$ $^a$Total sodium sulfide from addition and from reaction of NaOH and NaSH.
$^b$Sodium acetate.
$^c$p-Dichlorobenzene.
$^d$1,2,4-Trichlorobenzene.
$^e$Relative to Na$_2$S = 1.
$^f$Melt flow at 315° C. in grams per 10 minutes under a 5 kg load.

EXAMPLE III

The branched poly(p-phenylene sulfide) prepared in Runs 1 to 5 were melt spun and drawn into fibers of approximately 20 denier. The fiber strength and knot strength were determined after aging the fibers at 230° C. (unless otherwise noted) in air. Results are given in Table II.

TABLE II

| Run No. | Polymer from Run No. | Fiber Strength, gpd$^a$ Weeks Aged | | | Knot Strength, gpd$^b$ Weeks Aged | | |
|---|---|---|---|---|---|---|---|
| | | 0 | 1 | 2 | 0 | 1 | 2 |
| 6 (prior art) | 1 | 3.0 | 2.7$^c$ | — | 2.3 | 1.7$^c$ | — |
| 7 (prior art) | 2 | 2.9 | 2.7$^c$ | — | 2.6 | 0.8(1.8$^c$) | — |
| 8 (invention) | 3 | 3.1 | 2.4 | 2.7 | 3.1 | 1.7 | 0.8 |
| 9 (invention) | 4 | 3.3 | 3.2 | 2.4 | 3.4 | 1.1 | 0.7 |
| 10 (invention) | 5 | 3.2 | 3.2 | 3.0 | 2.8 | 1.1 | 0.6 |

$^a$Fiber strength at failure, grams per denier.
$^b$Knot strength at failure grams per denier.
$^c$Aged at 200° C. Tests terminated after 48 hours due to deterioration of fiber.

The results given in Table II indicate that the inventive polymers prepared employing late addition of 1,2,4-trihalobenzene exhibit superior thermal aging properties compared to prior art polymers prepared employing early addition of 1,2,4-trihalobenzene.

We claim:
1. A process for the production of branched polymers of arylene sulfide said process comprising:
   (a) contacting under polymerization conditions for a time sufficient to form arylene sulfide polymer a reaction mixture comprising:
      (1) at least one p-dihalobenzene;
      (2) at least one alkali metal sulfide;
      (3) at least one organic amide;
      (4) water in an amount of about 1.0 mole to about 2.4 moles per mole of alkali metal sulfide, said amount including water of hydration; and
      (5) at least one alkali metal carboxylate;
   (b) contacting with said arylene sulfide polymer formed in said reaction mixture, under polymerization conditions, an amount of polyhaloaromatic compound having more than 2 halogen constituents per molecule sufficient to produce branched polymer and for a time up to about 75 minutes before entering upon termination of the polymerization process said time sufficient to produce branched polymer; and
   (c) contacting carbon dioxide with said arylene sulfide polymer formed in said reaction mixture in an amount sufficient to stabilize said polymer relative to thermal degradation and for a time having a range of up to about 1 hour before termination of the polymerization process.
2. The process of claim 1 wherein the polymerization temperature is within the range of about 180° C. to about 285° C.
3. The process of claim 2 wherein the polymerization is carried out at two different temperature levels with the polymerization conducted within a first temperature range of about 180° C. to about 245° C. and then within a second temperature range of about 245° C. to about 285° C. with the proviso that about 15 percent to about 70 percent of the total reaction time is within the first temperature range and the temperature during at least 50 percent of the reaction time in the first temperature range if at least 20° C. below the final temperature in the second temperature range.
4. A process of claim 2 or 3 wherein said alkali metal sulfide is produced in situ in the reaction mixture by the reaction of alkali metal hydroxide with alkali metal bisulfide.
5. A process of claim 2 or 3 wherein alkali metal hydroxide is present in a mole ratio of alkali metal hydroxide in excess of that required to react with alkali metal bisulfide to yield alkali metal sulfide within a range of about 0.008:1 to about 1:1.

6. A process of claim 2 or 3 wherein the mole ratio of (1) to (2) is within the range of about 0.9:1 to about 2:1; the mole ratio of (3) to (2) is in the range of about 2:1 to about 10:1; the mole ratio of (5) to (2) is within the range of about 0.05:1 to about 4:1 and the amount of polyhaloaromatic compound having more than two halogen substituents per molecule is generally in an amount of up to about 0.6 parts by weight per 100 parts by weight p-dihalobenzene.

7. A process according to claim 5 wherein (1) is p-dichlorobenzene, (2) is sodium sulfide produced in situ by the reaction of an excess of sodium hydroxide with sodium hydrosulfide, (3) is N-methyl-2-pyrrolidone, (5) is sodium acetate and the polyhaloaromatic compound having more than two halogen constituents per molecule is 1,2,4-trichlorobenzene.

8. A process according to claim 2 or 3 in which carbon dioxide is contacted with said arylene sulfide polymer formed in said reaction mixture, said carbon dioxide present in an amount in the range of 1:10 to 20:1 moles per mole of alkali metal hydroxide in excess of that required to react with alkali metal bisulfide.

9. A process according to claim 8 further comprising:
   (a) distilling of volatiles from the reaction mixture in which said arylene sulfide polymer has formed,
   (b) recovering said arylene sulfide polymer from the reaction mixture,
   (c) washing said arylene sulfide polymer, and
   (d) melt spinning said polymer to produce fiber having good thermal aging properties.

10. A fiber made by the process of claim 9.

* * * * *